US008606953B2

(12) United States Patent
Buser et al.

(10) Patent No.: US 8,606,953 B2
(45) Date of Patent: Dec. 10, 2013

(54) ADJUSTING AUDIO AND VIDEO SYNCHRONIZATION OF 3G TDM STREAMS

(75) Inventors: Mark L Buser, Green Brook, NJ (US); Ranjan Singh, Morristown, NJ (US)

(73) Assignee: Dialogic Corporation, Quebec (CA)

( * ) Notice: Subject to any disclaimer, the term of this patent is extended or adjusted under 35 U.S.C. 154(b) by 378 days.

(21) Appl. No.: 12/897,050

(22) Filed: Oct. 4, 2010

(65) Prior Publication Data

US 2012/0084453 A1 Apr. 5, 2012

(51) Int. Cl.
*G06F 15/16* (2006.01)

(52) U.S. Cl.
USPC .......................................... 709/231; 709/230

(58) Field of Classification Search
USPC ................................................. 709/230, 231
See application file for complete search history.

(56) References Cited

U.S. PATENT DOCUMENTS

| 6,021,449 A * | 2/2000 | Chow et al. ...................... 710/57 |
| 7,313,593 B1 * | 12/2007 | Pulito et al. .................... 709/204 |
| 7,680,153 B2 * | 3/2010 | Ma ................................. 370/503 |
| 2004/0125754 A1 | 7/2004 | Johnson |
| 2006/0209210 A1 | 9/2006 | Swan et al. |
| 2007/0245222 A1 | 10/2007 | Wang et al. |

OTHER PUBLICATIONS

NMS Communications, 3G-324M Interface Developer's Reference Manual, © 2005, pp. 1,2,76, and 108.

* cited by examiner

*Primary Examiner* — Wing F Chan
*Assistant Examiner* — Andrew Woo

(57) ABSTRACT

Systems and methods of adjusting synchronization of audio media streams and video media streams in 3G mobile communications systems that can mitigate the effects of temporal skew due to intervening processing elements associated with media channels carrying the respective media streams. The systems and methods are operative to adjust the synchronization of audio media streams and video media streams by receiving control messages that report delays due to such intervening processing elements, calculating a relative amount of delay using the reported delays for each media channel, and applying a delay factor based on the relative amount of delay to the faster media channel to place the audio media streams and the video media streams in proper temporal alignment. The delay factor is applied to the faster media channel at those locations within the mobile communications systems where the audio and video media streams are combined and/or separated for subsequent transmission.

41 Claims, 7 Drawing Sheets

ADJUSTING AUDIO AND VIDEO SYNCHRONIZATION OF 3G TDM STREAMS

CROSS REFERENCE TO RELATED APPLICATIONS

—Not applicable—

STATEMENT REGARDING FEDERALLY SPONSORED RESEARCH OR DEVELOPMENT

—Not applicable—

FIELD OF THE INVENTION

The present application relates generally to third generation (also referred to herein as "3G") mobile communications systems, and more specifically to systems and methods of adjusting synchronization of audio media streams and video media streams in 3G mobile communications systems.

BACKGROUND OF THE INVENTION

In recent years, significant advances have been made in the development and implementation of mobile communications systems and devices with multimedia capability. For example, great strides have been made in the development and implementation of mobile phones and other types of mobile devices capable of transmitting and receiving audio media streams and video media streams in real-time. The 3G-324M protocol standard, which is a derivative of the International Telecommunications Union (ITU) H.324 standard, has been adopted to support such real-time streaming of audio and video media over circuit-switched wireless networks. Under the 3G-324M protocol standard, at least three different types of media streams can be defined, including audio, video, and control. To transmit such media streams over media channels within circuit-switched wireless networks, the 3G-324M protocol standard specifies the use of the H.223 multiplexing/de-multiplexing protocol, which can be employed to interleave or otherwise combine the different types of media streams, and, using the combined media stream, to assemble multiple multimedia packets into a single bit stream for subsequent transmission over a circuit-switched wireless network.

During the transmission of combined audio, video, and control media streams under the 3G-324M protocol standard, the audio media streams and the video media streams may, at times, need be separated into two or more media channels to allow certain processing operations to be performed that are dependent on the nature of the respective media streams. For example, such processing operations may include transforming the audio media streams and the video media streams to conform with/to a different protocol standard, changing the bandwidth used for the respective media streams, and/or performing other suitable processing operations on the respective media streams. While such processing operations are being performed on the audio media streams and the video media streams, the separate media channels carrying the media streams may pass through different processing elements, which may subject the respective media streams to different amounts of delay, resulting in a relative delay—referred to herein as "temporal skew"—between the two media channels. At a later point in time, some amount of delay may be applied to the so-called "faster" media channel to place the audio media streams and the video media streams in proper temporal alignment, thereby synchronizing subsequent playback of the two media channels. Such proper temporal alignment of the audio media streams and the video media streams is also referred to herein as "proper lip synchronization" of the respective media streams.

Under the 3G-324M protocol standard, the H.245 control protocol may be employed to send control messages to endpoints participating in the transmission of audio media streams and video media streams. For example, H.245 control messages may be sent to the endpoints to provide indications of any known amounts of temporal skew between media channels carrying the respective media streams. Such endpoints may include mobile devices such as mobile phones, and the audio media streams and the video media streams may be transmitted during a call initiated by one of the mobile phones. Further, the mobile phones may pass such temporal skew indications to a host application controlling the call activity between the respective devices. Based on such temporal skew indications, the host application can apply an amount of delay to the faster media channel to synchronize playback of the two media channels on the respective devices. This technique of synchronizing the playback of audio media channels and video media channels has drawbacks, however, in that it generally only considers the total amount of temporal skew occurring end-to-end along transmission paths, without taking into account any specific amounts of temporal skew that may have been introduced by intervening processing elements disposed along such transmission paths. Moreover, some types of endpoints may be incapable of handling such control messages, essentially leaving no other way of mitigating the effects of temporal skew.

It would therefore be desirable to have systems and methods of adjusting synchronization of audio media streams and video media streams in 3G mobile communications systems that avoid at least some of the drawbacks of the mobile communications systems and devices described above.

BRIEF SUMMARY OF THE INVENTION

In accordance with the present application, systems and methods of adjusting synchronization of audio media streams and video media streams in third generation (also referred to herein as "3G") mobile communications systems are disclosed that can mitigate the effects of temporal skew due to intervening processing elements associated with media channels carrying the respective media streams. The disclosed systems and methods are operative to adjust the synchronization of audio media streams and video media streams by receiving control messages that report delays due to such intervening processing elements, calculating a relative amount of delay using the reported delays for each media channel, and applying delay factors based on the relative amount of delay to the so-called "faster" media channel to place the audio media streams and the video media streams in proper temporal alignment. In accordance with the disclosed systems and methods, such delay factors are applied to the faster media channel at those locations within the mobile communications systems where the audio media streams and the video media streams are combined and/or separated for subsequent transmission.

In accordance with one aspect, a system for adjusting synchronization of audio media streams and video media streams in a 3G mobile communications system includes a plurality of Internet protocol (IP) media endpoints including a multiplexer media endpoint (also referred to herein as the "MUX endpoint") and a de-multiplexer media endpoint (also referred to herein as the "DEMUX endpoint"). In accordance with an exemplary aspect, both the MUX endpoint and the DEMUX endpoint are configured to conform with/to the H.223 multiplexing/de-multiplexing protocol. In accordance with another exemplary aspect, the MUX endpoint and the DEMUX endpoint can be implemented in a combined MUX/DEMUX endpoint. The MUX endpoint includes a first internal queue for receiving an IP audio media stream (also referred to herein as the "IP audio stream") over a packet network, a second internal queue for receiving an IP video media stream (also referred to herein as the "IP video stream") over the packet network, and a control messaging component for receiving a control information packet stream over the packet network. In accordance with still another exemplary aspect, the MUX endpoint receives each of the IP audio stream and the IP video stream over the packet network as a real-time protocol (RTP) packet stream. In accordance with a further exemplary aspect, the control messaging component within the MUX endpoint is configured to conform with the H.245 control protocol. The MUX endpoint also includes a multiplexer for receiving data from selected ones of the first and second internal queues containing the IP audio stream and the IP video stream, respectively, and the control messaging component containing the control information packet stream, interleaving or otherwise combining the data associated with the IP audio stream, the IP video stream, and/or the control information packet stream, and assembling, using the combined data, multiple multimedia packets (also referred to herein as the "multiplexer physical data units" or "MUX-PDUs") into a single bit stream for subsequent transmission over a circuit-switched wireless network. In accordance with another exemplary aspect, the disclosed system includes a framer component that assembles the single bit stream as a time division multiplexed (TDM) stream for subsequent transmission over the circuit-switched wireless network. The DEMUX endpoint includes a de-multiplexer for receiving a TDM stream over the circuit-switched wireless network, and effectively splitting the TDM stream into a TDM audio stream, a TDM video stream, and/or a TDM control information stream. The DEMUX endpoint further includes a first internal queue for receiving the TDM audio stream, a second internal queue for receiving the TDM video stream, and a control messaging component for receiving the TDM control information stream. In accordance with still another exemplary aspect, the control messaging component included in the DEMUX endpoint is configured to conform with/to the H.245 control protocol.

In accordance with another aspect, the MUX endpoint and the DEMUX endpoint are operative to adjust the synchronization of audio media streams and video media streams at the locations where the respective media streams are combined and separated, respectively, for subsequent transmission. In an exemplary mode of operation, the MUX endpoint receives, over the packet network, a control information packet stream including control messages containing indications of amounts of delay due to one or more intervening processing elements associated with an IP audio media channel (also referred to herein as the "IP audio channel") and an IP video media channel (also referred to herein as the "IP video channel") carrying the IP audio stream and the IP video stream, respectively. In accordance with an exemplary aspect, such control messages received at the MUX endpoint are private to the MUX endpoint. In accordance with another exemplary aspect, the control information packet stream received at the MUX endpoint may also include one or more H.245 control messages containing indications of amounts of temporal skew occurring end-to-end along the transmission path. The MUX endpoint calculates a relative amount of delay by taking the difference between the reported delays for the respective IP audio media channel and the respective IP video media channel, and applies a delay factor based on the relative amount of delay to the faster IP media channel. In accordance with still another exemplary aspect, the MUX endpoint applies the delay factor to the faster IP media channel according to the arrival times of RTP payloads contained in the corresponding IP audio or video stream. In accordance with yet another exemplary aspect, because the MUX endpoint generally operates on one MUX-PDU at a time, the MUX endpoint can delay the RTP payloads carried by the faster IP media channel at the rate of an MUX-PDU. In accordance with this exemplary mode of operation, for each of the IP audio stream and the IP video stream, the MUX endpoint performs input processing including determining whether or not the corresponding internal queue for the respective media stream is full; if the internal queue is not full, reading an RTP packet from the respective media stream; stripping the RTP payload from the RTP packet; applying the delay factor to the RTP payload according to the arrival time of the RTP payload; and, appending the delay factor to a buffer containing the RTP payload for subsequent storage in the internal queue for the respective media stream. In further accordance with this exemplary mode of operation, the MUX endpoint performs output processing using a loop implementation that ages the delay factors for the RTP payloads in the internal queues once for each execution of the loop, which may be periodic. Such output processing includes reading an RTP audio payload from the first internal queue having a delay factor that has aged to zero, reading an RTP video payload from the second internal queue having a delay factor that has aged to zero, reading an H.245 control message from the control messaging component, assembling a MUX-PDU from the RTP audio payload, the RTP video payload, and/or the H.245 control message, as appropriate; forming a TDM frame from the MUX-PDU; and, transmitting the TDM frame as part of a TDM stream over the circuit-switched wireless network.

Like the MUX endpoint, the DEMUX endpoint can receive a control information stream including control messages containing indications of amounts of delay due to one or more intervening processing elements, such as intervening processing elements associated with a TDM audio media channel (also referred to herein as the "TDM audio channel") and a TDM video media channel (also referred to herein as the "TDM video channel") carrying the TDM audio stream and the TDM video stream, respectively. In accordance with an exemplary aspect, such control messages received at the DEMUX endpoint are private to the DEMUX endpoint. In accordance with another exemplary aspect, the control information stream received at the DEMUX endpoint may also include one or more H.245 control messages containing indications of amounts of temporal skew occurring end-to-end along the transmission path. The DEMUX endpoint calculates a relative amount of delay by taking the difference between the reported delays for the respective TDM audio media channel and the respective TDM video media channel, and adjusts the delays to avoid introducing temporal skew into the TDM audio stream and the TDM video stream. In accordance with another exemplary aspect, the DEMUX endpoint adjusts the delays according to the arrival times of TDM payloads contained in the corresponding TDM audio or video stream. In accordance with an exemplary mode of operation, the DEMUX endpoint processes incoming TDM frames including receiving a TDM frame containing a MUX-PDU from a TDM stream, and effectively splitting the MUX-PDU to obtain a TDM audio payload, a TDM video payload, and/or an H.245 control message from the MUX-PDU. If a TDM audio payload is obtained from the MUX-PDU, then the DEMUX endpoint stores the TDM audio payload with the delay factor applied thereto in the first internal queue within the DEMUX endpoint. If a TDM video payload is obtained from the MUX-PDU, then the DEMUX endpoint stores the TDM video payload with the delay factor applied thereto in the second internal queue within the DEMUX endpoint. If an H.245 control message is obtained from the MUX-PDU, then the DEMUX endpoint stores the H.245 control message in the control messaging component within the DEMUX endpoint. In further accordance with this exemplary mode of operation, the DEMUX endpoint performs processing of incoming TDM frames using a loop implementation that ages the delay factors for the TDM audio and video payloads in their respective internal queues once for each execution of the loop, which may be periodic. The processing of the incoming TDM frames continues with the DEMUX endpoint reading a TDM audio payload from the first internal queue having a delay factor that has aged to zero, reading a TDM video payload from the second internal queue having a delay factor that has aged to zero, and reading an H.245 control message from the control messaging component. The DEMUX endpoint encapsulates the TDM audio payloads, the TDM video payloads, and/or the H.245 control messages, as appropriate, to form an RTP audio stream, an RTP video stream, and/or a control packet stream, respectively, for subsequent transmission over the packet network.

By receiving control messages that report delays due to intervening processing elements associated with separate media channels carrying audio media streams and video media streams, respectively, calculating a relative amount of delay using the reported delays for each media channel, and applying a delay factor based on the relative amount of delay to the faster media channel, the effects of temporal skew due to intervening processing elements associated with the respective media channels can be reduced. This beneficial reduction in the effects of temporal skew due to such intervening processing elements can be achieved by applying the delay factor to the faster media channel at locations where the audio media streams and the video media streams are combined and/or separated for subsequent transmission.

Other features, functions, and aspects of the invention will be evident from the Drawings and/or the Detailed Description of the Invention that follow.

BRIEF DESCRIPTION OF THE SEVERAL VIEWS OF THE DRAWINGS

The invention will be more fully understood with reference to the following Detailed Description of the Invention in conjunction with the drawings of which.

DETAILED DESCRIPTION OF THE INVENTION

Systems and methods of adjusting synchronization of audio media streams and video media streams in third generation (also referred to herein as "3G") mobile communications systems are disclosed that can mitigate the effects of temporal skew due to intervening processing elements associated with media channels carrying the respective media streams. In accordance with the disclosed systems and methods, synchronization of audio media streams and video media streams is adjusted by receiving control messages that report delays due to such intervening processing elements, calculating a relative amount of delay using the reported delays for each media channel, and applying delay factors based on the relative amount of delay to the so-called "faster" media channel to place the audio media streams and the video media streams in proper temporal alignment. In further accordance with the disclosed systems and methods, such delay factors are applied to the faster media channel at those locations within the mobile communications systems where the audio media streams and the video media streams are combined and/or separated for subsequent transmission.

Figure 1:
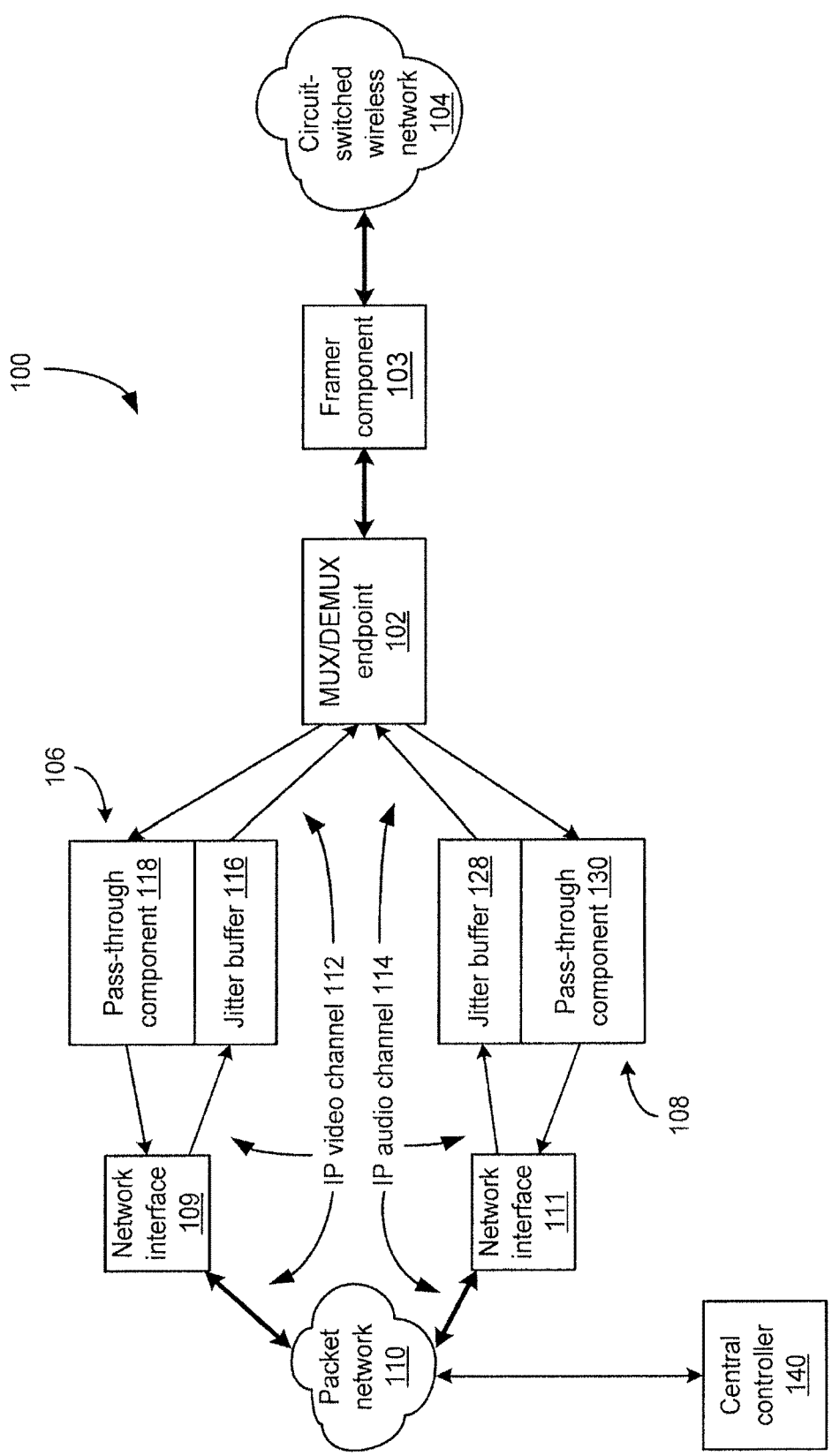
FIG. 1 is a block diagram of an exemplary third generation (also referred to herein as "3G") mobile communications system including an exemplary multiplexer/de-multiplexer media endpoint, and exemplary intervening processing elements disposed between the multiplexer/de-multiplexer media endpoint and a packet network, according to an exemplary embodiment of the present application.

FIG. 1 depicts an illustrative embodiment of a 3G mobile communications system 100 in which an exemplary multiplexer/de-multiplexer media endpoint 102 may be deployed, according to the present application. As shown in FIG. 1, the 3G mobile communications system 100 includes the multiplexer/de-multiplexer media endpoint 102 (also referred to herein as the "MUX/DEMUX endpoint 102"), a circuit-switched wireless network 104, a packet network 110, and a plurality of intervening processing elements 106, 108 disposed between the MUX/DEMUX endpoint 102 and the packet network 110. For example, the packet network 110 may include an Internet protocol (IP) network or any other suitable type of packet network. The intervening processing elements 106, 108 are communicably coupled to the packet network 110 via network interfaces 109, 111, respectively. For example, each of the network interfaces 109, 111 may include a network interface card (NIC) or any other suitable type and/or configuration of network interface. Further, the MUX/DEMUX endpoint 102 is communicably coupled to the circuit-switched wireless network 104 via a framer component 103. The intervening processing element 106 is associated with an IP video media channel 112 (also referred to herein as the "IP video channel 112") for carrying IP video media streams (also referred to herein as the "IP video streams"), and the intervening processing element 108 is associated with an IP audio media channel 114 (also referred to herein as the "IP audio channel 114") for carrying IP audio media streams (also referred to herein as the "IP audio streams"). For example, the intervening processing element 106 may constitute a video processing element containing one or more video processing components such as a jitter buffer 116 and a pass-through component 118, or any other suitable video processing element. Similarly, the intervening processing element 108 may constitute an audio processing element containing one or more audio processing components such as a jitter buffer 128 and a pass-through component 130, or any other suitable audio processing element.

In accordance with the illustrative embodiment of FIG. 1, the MUX/DEMUX endpoint 102 can reduce the effects of temporal skew due to the intervening processing elements 106, 108 associated with the IP video channel 112 and the IP audio channel 114, respectively, by receiving control messages that report delays due to the intervening processing elements 106, 108, calculating a relative amount of delay using the reported delays for each of the IP video channel 112 and the IP audio channel 114, and applying a delay factor (one that typically—but not necessarily—amounts to milliseconds) based on the relative amount of delay to the faster one of the IP video channel 112 and the IP audio channel 114 to place the IP audio stream and the IP video stream in proper temporal alignment. It is noted that one or more intervening processing elements, like the intervening processing elements 106, 108 or any other suitable processing elements, associated with a time division multiplexed (TDM) audio media channel (also referred to herein as the "TDM audio channel") and a TDM video media channel (also referred to herein as the "TDM video channel") carrying a TDM audio media stream (also referred to herein as the "TDM audio stream") and a TDM video media stream (also referred to herein as the "TDM video stream"), respectively, may also be communicably coupled between the MUX/DEMUX endpoint 102 and the circuit-switched wireless network 104. Because they are optional, and for clarity of illustration, such intervening processing elements associated with the TDM audio channel and the TDM video channel have been omitted from FIG. 1.

Figure 2:
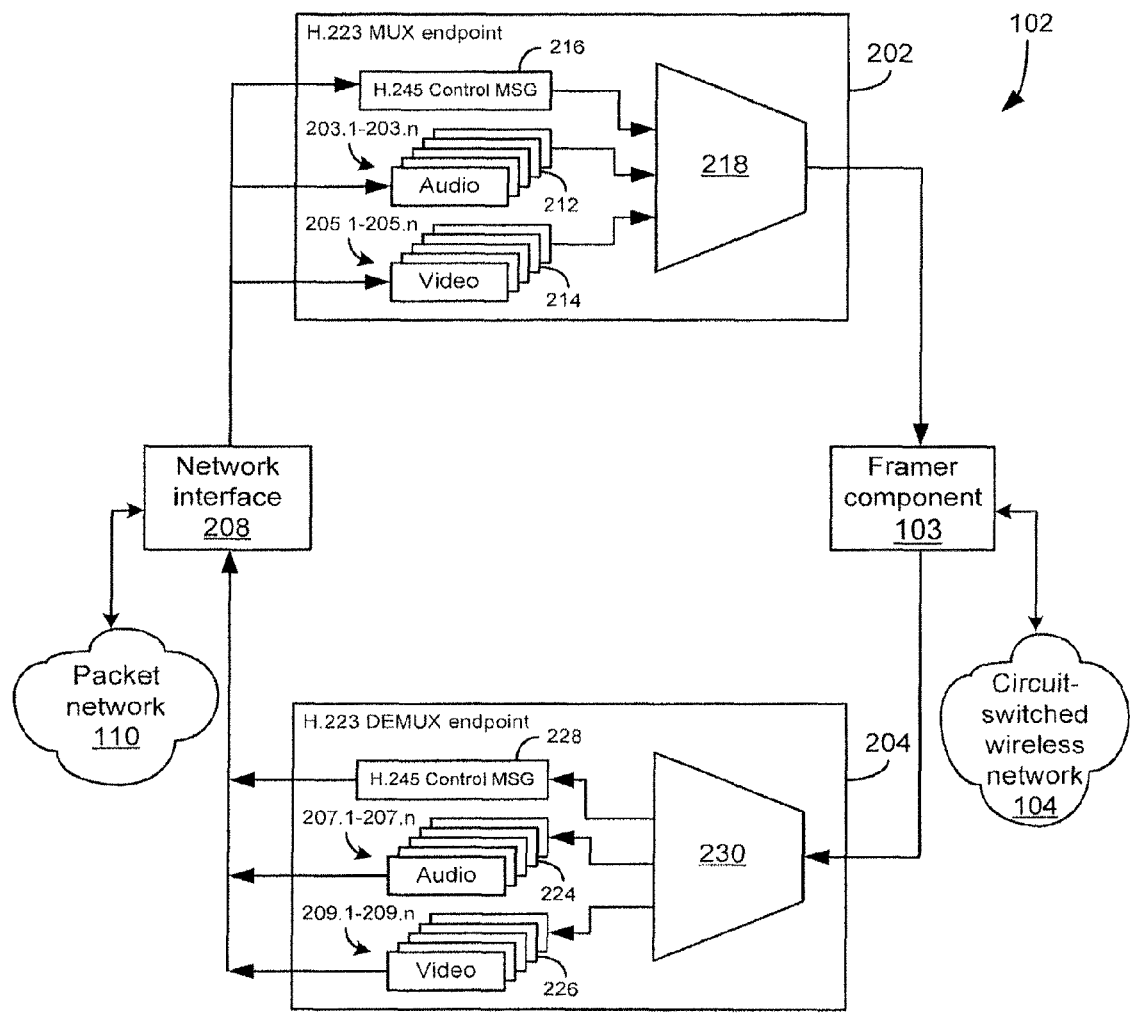
FIG. 2 is a block diagram of the multiplexer/de-multiplexer media endpoint of FIG. 1, including an exemplary multiplexer media endpoint (also referred to herein as the "MUX endpoint") and an exemplary de-multiplexer media endpoint (also referred to herein as the "DEMUX endpoint")

FIG. 2 depicts an illustrative embodiment of the exemplary MUX/DEMUX endpoint 102 of FIG. 1. As shown in FIG. 2, the MUX/DEMUX endpoint 102 includes a multiplexer media endpoint 202 (also referred to herein as the "MUX endpoint 202") and a de-multiplexer media endpoint 204 (also referred to herein as the "DEMUX endpoint 204"). For example, both the MUX endpoint 202 and the DEMUX endpoint 204 may be configured to conform with/to the H.223 multiplexing/de-multiplexing protocol, or any other suitable multiplexing/de-multiplexing protocol. Further, in accordance with the illustrative embodiment of FIG. 2, the framer component 103 is communicably coupled between the MUX endpoint 202, the DEMUX endpoint 204, and the circuit-switched wireless network 104. Also, in accordance with the illustrative embodiment of FIG. 2, at least one network interface 208, such as a NIC or any other suitable type and/or configuration of network interface, is communicably coupled between the MUX endpoint 202, the DEMUX endpoint 204, and the packet network 110. It is noted that the intervening processing elements 106, 108 (see FIG. 1) and the network interfaces 109, 111 (see FIG. 1) have been omitted from FIG. 2 for clarity of illustration. The framer component 103 is operative to receive multimedia packets (also referred to herein as the "multiplexer physical data units" or "MUX-PDUs") from the MUX endpoint 202, and to form TDM frames from the MUX-PDUs for subsequent transmission over the circuit-switched wireless network 104 as part of one or more TDM streams. The framer component 103 is further operative to receive TDM frames from one or more TDM streams transmitted over the circuit-switched wireless network 104 for subsequent processing by the DEMUX endpoint 204. In accordance with the illustrative embodiment of FIG. 2, the TDM streams can include TDM audio streams, TDM video streams, and/or TDM control information streams. Moreover, the network interface 208 is operative to receive real-time protocol (RTP) packet streams (also referred to herein as the "RTP streams") from the DEMUX endpoint 204 for subsequent transmission over the packet network 110, and to receive RTP packets from one or more RTP streams transmitted over the packet network 110 for subsequent processing by the MUX endpoint 202. In further accordance with the illustrative embodiment of FIG. 2, the RTP streams can include IP audio streams, IP video streams, and/or control information packet streams. It is noted that the control information packet streams may—but not necessarily—conform with/to the IP protocol, the RTP protocol, or any other suitable transmission protocol.

As further shown in FIG. 2, the MUX endpoint 202 includes a first internal queue 212 for receiving IP audio streams over the packet network 110, a second internal queue 214 for receiving IP video streams over the packet network 110, and a control messaging component 216 for receiving control information packet streams over the packet network 110. As graphically illustrated in FIG. 2, the first internal queue 212 includes a plurality of buffers 203.1-203.n for storing RTP packets from the IP audio streams, and the second internal queue 214 includes a plurality of buffers 205.1-205.n for storing RTP packets from the IP video streams. It is noted that the control messaging component 216 may be configured to conform with/to the H.245 control protocol, or any other suitable control protocol. The MUX endpoint 202 also includes a multiplexer 218 operative to receive data from selected ones of the first and second internal queues 212, 214 containing the IP audio streams and the IP video streams, respectively, and the control messaging component 216 containing the control information packet streams. The multiplexer 218 is further operative to interleave or otherwise combine the data associated with the IP audio streams, the IP video streams, and/or the control information packet streams, as appropriate, and to assemble, using the combined data, multiple MUX-PDUs into a single bit stream for subsequent transmission over the circuit-switched wireless network 104. The DEMUX endpoint 204 includes a de-multiplexer 230 operative to receive TDM streams over the circuit-switched wireless network 104, and to effectively split the respective TDM streams into TDM audio streams, TDM video streams, and/or TDM control information streams. The DEMUX endpoint 204 also includes a first internal queue 224 for receiving the TDM audio streams, a second internal queue 226 for receiving the TDM video streams, and a control messaging component 228 for receiving the TDM control information streams. As graphically illustrated in FIG. 2, the first internal queue 224 includes a plurality of buffers 207.1-207.n for storing TDM audio payloads from the TDM audio streams, and the second internal queue 226 includes a plurality of buffers 209.1-209.n for storing TDM video payloads from the TDM video streams. It is noted that the control messaging component 228 may be configured to conform with/to the H.245 control protocol, or any other suitable control protocol. In further accordance with the illustrative embodiment of FIG. 2, the DEMUX endpoint 204 is operative to encapsulate the TDM audio streams, the TDM video streams, and/or the TDM control information streams, as appropriate, to form RTP audio streams, the RTP video streams, and/or the control information packet streams, respectively, for subsequent transmission over the packet network 110.

In accordance with the present application, the MUX endpoint 202 and the DEMUX endpoint 202 are operative to adjust the synchronization of audio media streams and video media streams at the locations where the respective media streams are combined and separated, respectively, for subsequent transmission. In accordance with an exemplary mode of operation, the MUX endpoint 202 is operative to receive, over the packet network 110, a control information packet stream including at least one control message containing an indication of an amount of delay due to one of the intervening processing elements 106, 108 associated with the IP video channel 112 and the IP audio channel 114, respectively, in one direction or the opposite direction along the transmission path. In accordance with the illustrative embodiment of FIG. 2, such control messages received at the MUX endpoint 202 are private to the MUX endpoint 202. It is noted that the control information packet stream received at the MUX endpoint 202 may also include one or more H.245 control messages containing indications of amounts of temporal skew occurring end-to-end along the transmission path. For example, the amounts of delay due to one or both of the intervening processing elements 106, 108 may be reported to the MUX endpoint 202 via one or more control messages periodically, episodically, at times when the depths of the corresponding jitter buffers 116, 128 change, or at any other suitable time. It is further noted that such amounts of delay due to intervening processing elements, as reported via such control messages, may be set to any suitable initial or default values. The MUX endpoint 202 is further operative to calculate a relative amount of delay by taking the difference between the delays reported for the IP video channel 112 and the IP audio channel 114, and to apply a delay factor based on the relative amount of delay to the faster one of the IP video channel 112 and the IP audio channel 114. In further accordance with the illustrative embodiment of FIG. 2, the MUX endpoint 202 applies the delay factor to the faster IP media channel (112 or 114) according to the arrival times of RTP payloads contained in the corresponding IP audio or video stream received at the MUX endpoint 202.

Figure 3A:
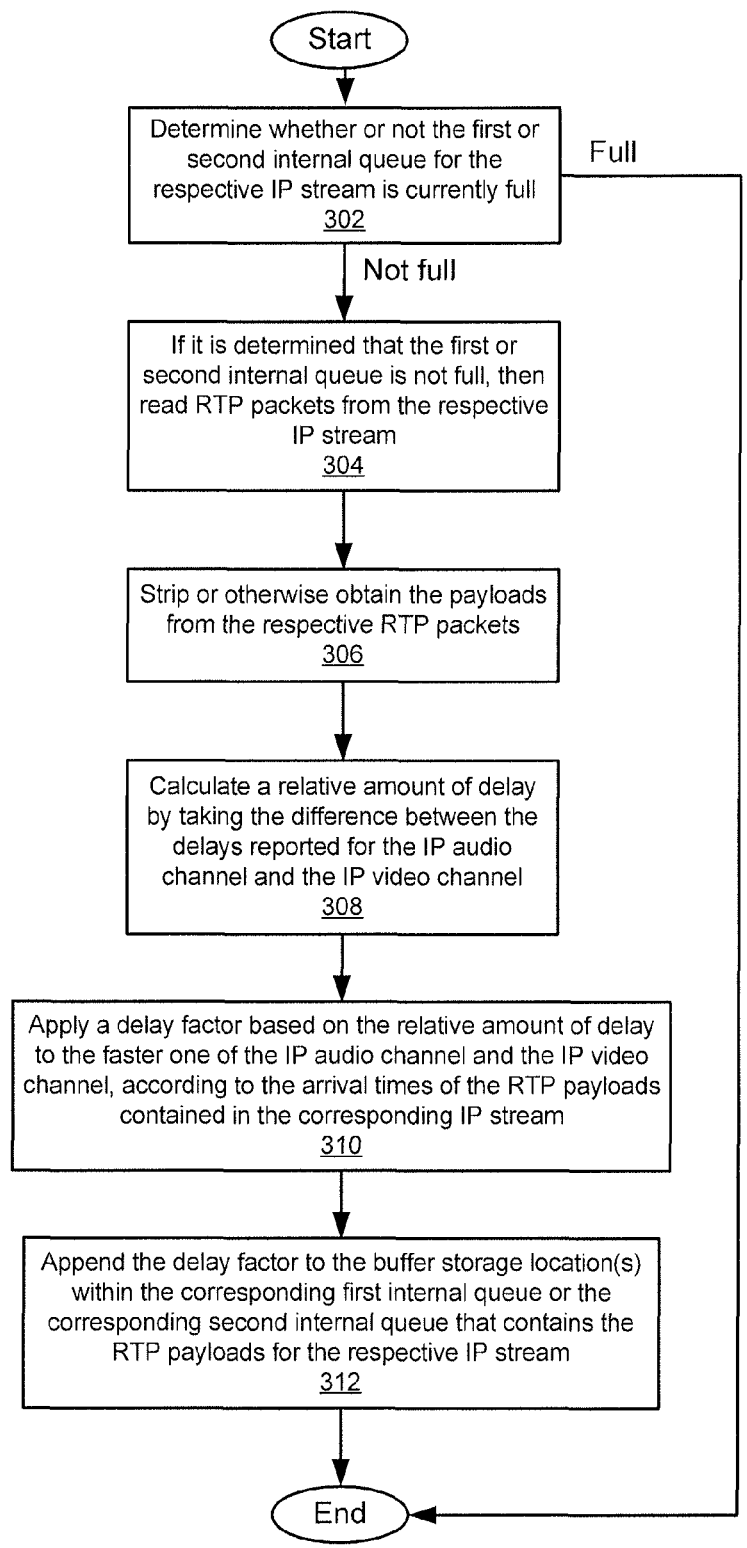
FIG. 3*a* is a flow diagram depicting exemplary input processing performed at the MUX endpoint of FIG. 2.

An exemplary method of operating the MUX endpoint 202 included in the MUX/DEMUX endpoint 102 is described below with reference to FIGS. 1, 2, 3a, 3b, and 5. As shown in FIG. 3a, the MUX endpoint 202 performs input processing of incoming IP audio streams and/or IP video streams by determining, as depicted in step 302, whether or not the corresponding first or second internal queue 212, 214 for the respective IP stream is currently full. If it is determined at step 302 that the corresponding first or second internal queue 212, 214 for the respective IP stream is full, then the input processing of the respective IP stream ends, as shown in FIG. 3a. Otherwise, if it is determined that the corresponding first or second internal queue 212, 214 is not full, then the MUX endpoint 202 reads RTP packets from the respective IP stream, as depicted in step 304, and strips or otherwise obtains the payloads from the respective RTP packets, as depicted in step 306. As depicted in step 308, the MUX endpoint 202 calculates a relative amount of delay by taking the difference between the delays reported for the IP audio channel 114 and the IP video channel 112. Further, the MUX endpoint 202 applies a delay factor based on the relative amount of delay to the faster one of the IP audio channel 114 and the IP video channel 112, according to the arrival times of the RTP payloads contained in the corresponding IP stream, as depicted in step 310. As depicted in step 312, the MUX endpoint 202 appends the delay factor to the buffer storage location(s) (e.g., a current sync delay storage location 510 contained in an exemplary delay buffer 500; see FIG. 5) within the corresponding first internal queue 212 or the corresponding second internal queue 214 that contains the RTP payloads for the respective IP stream. It is noted that delays can be different for different storage locations in the delay buffer 500 if one or more new and different delays are reported. Further, in accordance with the exemplary method of FIG. 3a, all entries in the delay buffer 500 are only set at RTP read time and age independently.

Figure 3B:
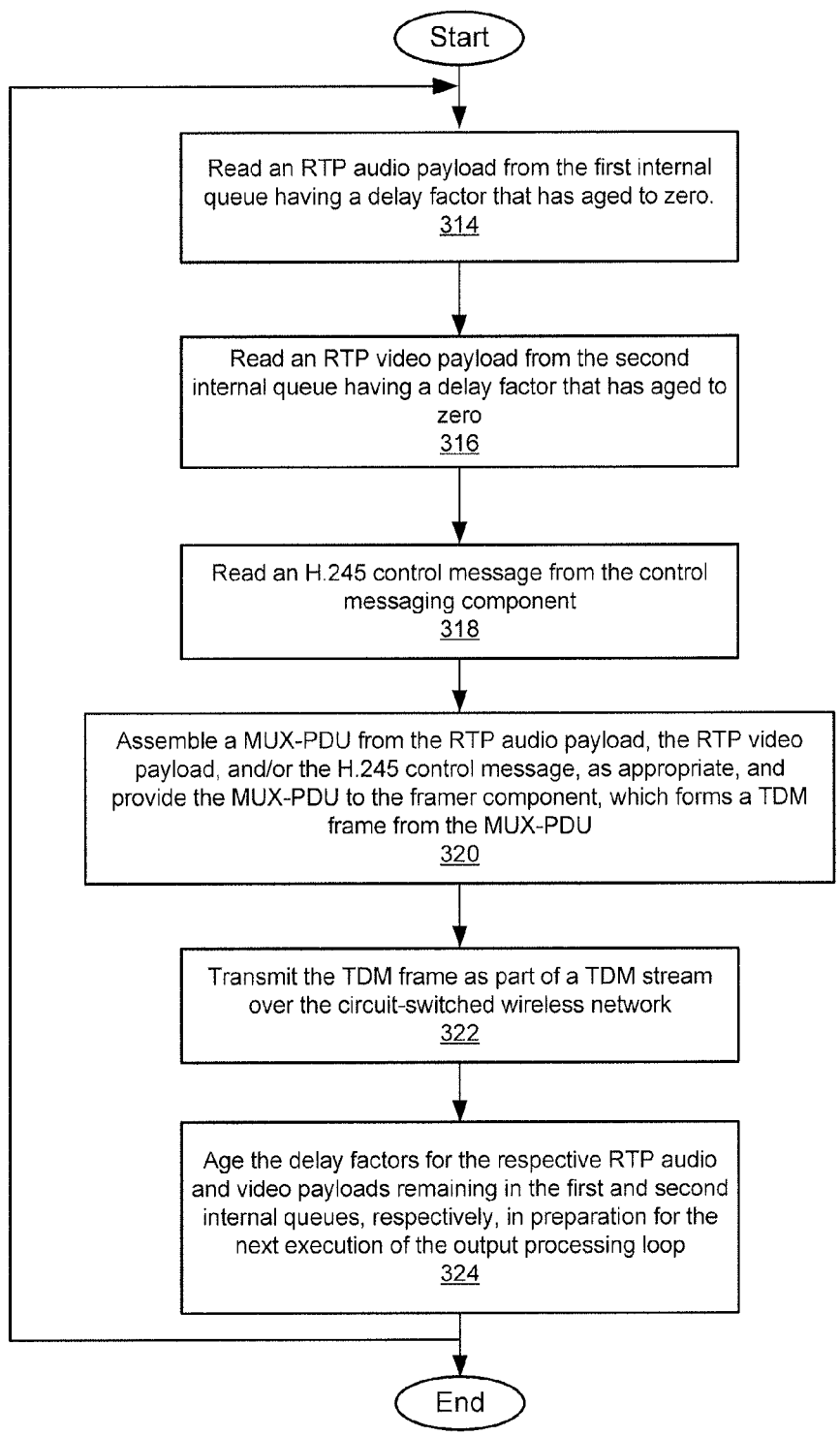
FIG. 3*b* is a flow diagram depicting exemplary output processing performed at the MUX endpoint of FIG. 2.

As shown in FIG. 3b, the MUX endpoint 202 performs output processing of the RTP audio and video payloads contained in the first and second internal queues 212, 214 using a loop implementation that ages the delay factors for the respective RTP payloads once for each execution of the loop, which may be periodic. As employed herein, the phrase "to age a delay factor" means to decrement the delay factor value repeatedly by/for a predetermined amount of time, such as about 20 milliseconds or any other suitable amount of time, until the delay factor value is equal to or approximately equal to zero. As depicted in step 314, the MUX endpoint 202 reads an RTP audio payload from the first internal queue 212 having a delay factor that has aged to zero. Further, the MUX endpoint 202 reads an RTP video payload from the second internal queue 214 having a delay factor that has aged to zero, as depicted in step 316. Moreover, the MUX endpoint 202 reads an H.245 control message from the control messaging component 216, as depicted in step 318. As depicted in step 320, the MUX endpoint 202 assembles a MUX-PDU from the RTP audio payload, the RTP video payload, and/or the H.245 control message, as appropriate, and provides the MUX-PDU to the framer component 103, which forms a TDM frame from the MUX-PDU. As depicted in step 322, the TDM frame is then transmitted as part of a TDM stream over the circuit-switched wireless network 104. As depicted in step 324, the MUX endpoint 202 ages the delay factors for the respective RTP audio and video payloads remaining in the first and second internal queues 212, 214, respectively, in preparation for the next execution of the output processing loop. Because, while performing output processing of the RTP audio and video payloads, the MUX endpoint 202 operates on one MUX-PDU at a time, the MUX endpoint 202 can delay the RTP payloads carried by the faster IP channel at the processing rate of an MUX-PDU. For example, the MUX endpoint 202 may apply calculated amounts of delay to the respective RTP payloads carried by the faster IP channel in increments of about 20 milliseconds, or any other suitable increments of time. Further, based on the size of the MUX-PDU and/or the sizes of the first and second internal queues 212, 214, the amount of delay applied to the respective RTP payloads may range from about 0 milliseconds to about 100 milliseconds, or any other suitable range of time. It is noted that the first and second internal queues 212, 214 within the MUX endpoint 202, and/or the control messages received at the MUX endpoint 202, can be implemented on a per 3G channel basis, e.g., unique per channel.

In accordance with a further exemplary mode of operation, the DEMUX endpoint 204 is operative to receive a control information stream including at least one control message containing an indication of an amount of delay due to one or more intervening processing elements, such as intervening processing elements associated with a TDM audio channel carrying a TDM audio stream and/or a TDM video channel carrying a TDM video stream, in one direction or the opposite direction along the transmission path. In accordance with the illustrative embodiment of FIG. 2, such control messages received at the DEMUX endpoint 204 are private to the DEMUX endpoint 204. It is noted that the control information stream received at the DEMUX endpoint 204 may also include one or more H.245 control messages containing indications of amounts of temporal skew occurring end-to-end along the transmission path. The DEMUX endpoint 204 is further operative to calculate a relative amount of delay by taking the difference between the reported delays for the respective TDM audio channel and the respective TDM video channel, and to apply a delay factor based on the relative amount of delay to the faster one of the TDM audio channel and the TDM video channel. In accordance with the illustrative embodiment of FIG. 2, the DEMUX endpoint 204 applies the delay factor to the faster one of the TDM audio channel and the TDM video channel, according to the arrival times of TDM payloads contained in the corresponding TDM audio stream or TDM video stream. Further, the DEMUX endpoint 204 appends the delay factor to the buffer storage location(s) (e.g., the current sync delay storage location 510 contained in the delay buffer 500; see FIG. 5) within the first internal queue 224 or the second internal queue 226 that contains the TDM payloads for the corresponding TDM stream. For example, the DEMUX endpoint 204 may apply calculated amounts of delay to the respective TDM payloads carried by the faster one of the TDM audio channel and the TDM video channel in increments of about 20 milliseconds, or any other suitable increments of time. Further, based on the size of the MUX-PDU and/or the sizes of the first and second internal queues 224, 226, the amount of delay applied to the respective TDM payloads may range from about 0 milliseconds to about 100 milliseconds, or any other suitable range of time. It is noted that the first and second internal queues 224, 226 within the DEMUX endpoint 204, and/or the control messages received at the DEMUX endpoint 204, can be implemented on a per 3G channel basis, e.g., unique per channel.

Figure 4:
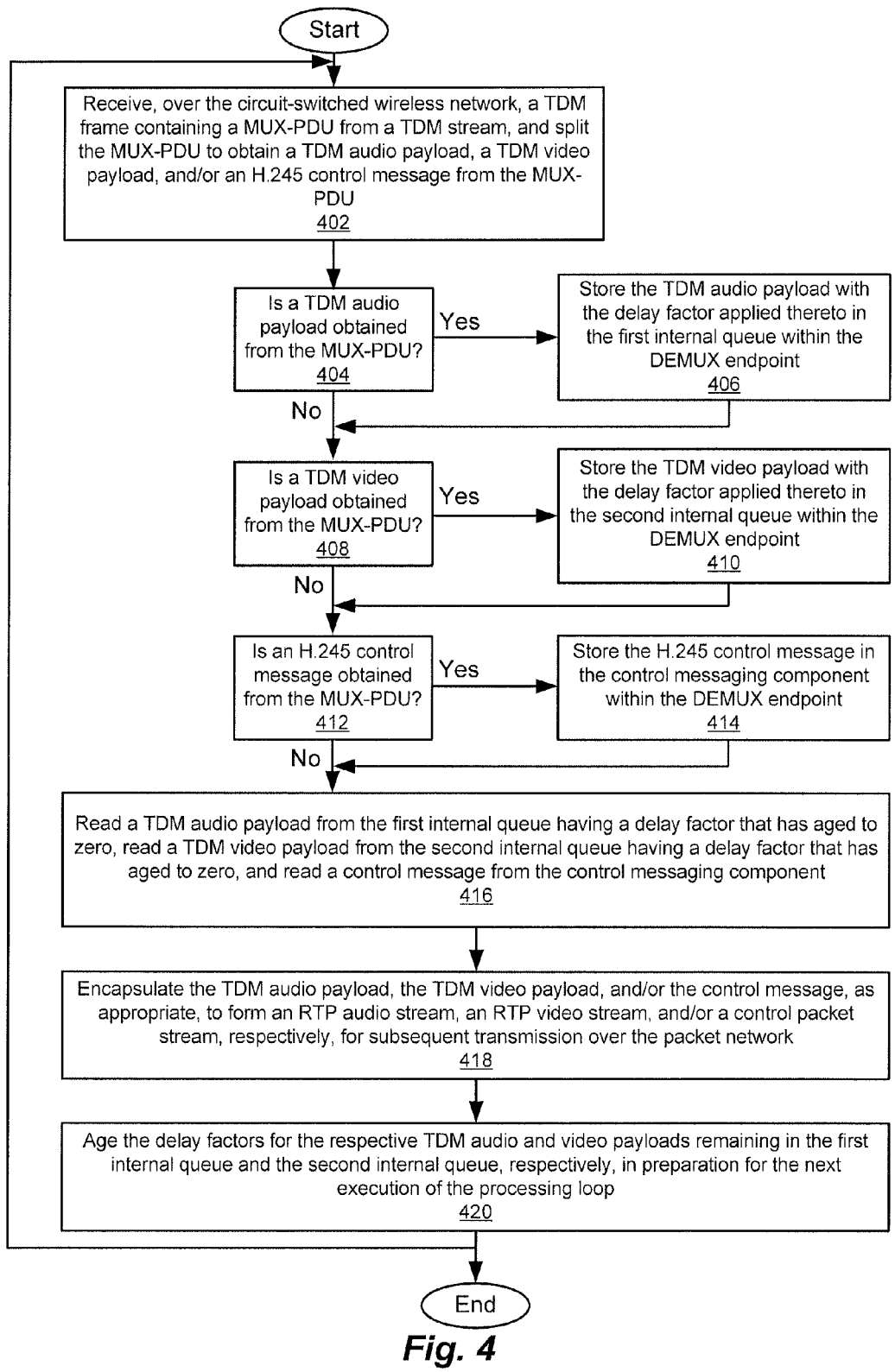
FIG. 4 is a flow diagram depicting exemplary processing performed at the DEMUX endpoint of FIG. 2.

An exemplary method of operating the DEMUX endpoint 204 included in the MUX/DEMUX endpoint 102 is described below with reference to FIGS. 1, 2, 4, and 5. As shown in FIG. 4, the DEMUX endpoint 204 performs processing of TDM audio and video payloads contained in the first internal queue 224 and the second internal queue 226, respectively, using a loop implementation that ages the delay factors for the respective TDM payloads once for each execution of the loop, which may be periodic. As depicted in step 402, the DEMUX endpoint 204 receives, over the circuit-switched wireless network 104, a TDM frame containing a MUX-PDU from a TDM stream, and effectively splits the MUX-PDU to obtain a TDM audio payload, a TDM video payload, and/or an H.245 control message from the MUX-PDU. As depicted in step 404, if a TDM audio payload is obtained from the MUX-PDU, then, in accordance with step 406, the DEMUX endpoint 204 stores the TDM audio payload with the delay factor applied thereto in the first internal queue 224 within the DEMUX endpoint 204. Otherwise, the method of FIG. 4 continues to step 408, whereby if a TDM video payload is obtained from the MUX-PDU, then, in accordance with step 410, the DEMUX endpoint 204 stores the TDM video payload with the delay factor applied thereto in the second internal queue 226 within the DEMUX endpoint 204. Otherwise, the method of FIG. 4 continues to step 412, whereby if an H.245 control message is obtained from the MUX-PDU, then, in accordance with step 414, the DEMUX endpoint 204 stores the H.245 control message in the control messaging component 228 within the DEMUX endpoint 204. Otherwise, the method of FIG. 4 continues to step 416, whereby the DEMUX endpoint 204 reads a TDM audio payload from the first internal queue 224 having a delay factor that has aged to zero. In addition, the DEMUX endpoint 204 reads a TDM video payload from the second internal queue 226 having a delay factor that has aged to zero, and reads a control message from the control messaging component 228, as further depicted in step 416. As depicted in step 418, the DEMUX endpoint 204 encapsulates the TDM audio payload, the TDM video payload, and/or the control message, as appropriate, to form an RTP audio stream, an RTP video stream, and/or a control packet stream, respectively, for subsequent transmission over the packet network 110. As depicted in step 420, the DEMUX endpoint 204 ages the delay factors for the respective TDM audio and video payloads remaining in the first internal queue 224 and the second internal queue 226, respectively, in preparation for the next execution of the processing loop.

Figure 5:
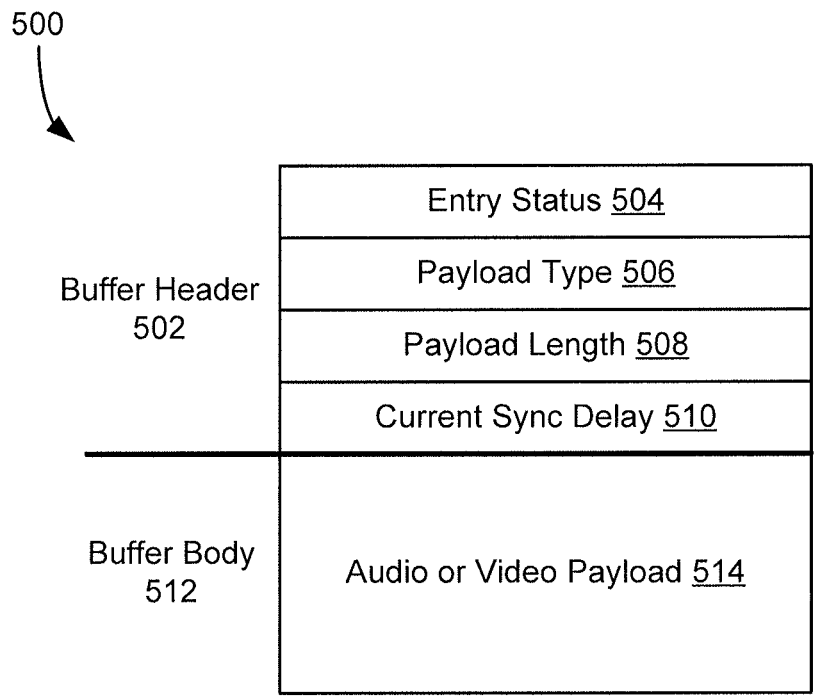
FIG. 5 is a diagram of an exemplary delay buffer included in internal queues for audio and video data contained in the MUX and DEMUX endpoints of FIG. 2.

As described above, the MUX endpoint 202 of FIG. 2 can append delay factors, as appropriate, to buffer storage locations within the first internal queue 212 and the second internal queue 214 containing RTP payloads for an IP audio stream and an IP video stream, respectively. In an analogous fashion, the DEMUX endpoint 204 of FIG. 2 can append delay factors, as appropriate, to buffer storage locations within the first internal queue 224 and the second internal queue 226 containing TDM payloads for TDM audio and video streams, respectively. FIG. 5 depicts the exemplary delay buffer 500, which is representative of one of the buffers 203.1-203.n, 205.1-205.n included in the first internal queue 212 and the second internal queue 214, respectively, within the MUX endpoint 202. It is noted that the delay buffer 500 is also representative of one of the buffers 207.1-207.n, 209.1-209.n included in the first internal queue 224 and the second internal queue 226, respectively, within the DEMUX endpoint 204. As shown in FIG. 5, the delay buffer 500 includes an exemplary buffer header 502 and an exemplary buffer body 512. The buffer header 502 includes a plurality of storage locations including an entry status 504 (e.g., "full" or "empty"), a payload type 506 (e.g., "IP audio," "IP video," "TDM audio," or "TDM video"), a payload length 508, and the current sync delay 510 (one that typically—but not necessarily—amounts to milliseconds) for use in storing the delay factor value. For example, the payload type 506 may be employed to determine whether it is necessary to transform the corresponding payload when transitioning from TDM-based payload transmission to packet-based payload transmission, or from packet-based payload transmission to TDM-based payload transmission. It is noted that, when transitioning from TDM-based payload transmission to packet-based payload transmission, the codec type may also be required to encapsulate a TDM video stream. Further, when transitioning from packet-based payload transmission to TDM-based payload transmission, the payload type 506 may be used to determine how to form a TDM payload from a corresponding RTP payload. Moreover, the buffer body 512 includes a storage location for an audio or video payload 514 (e.g., RTP audio payload, RTP video payload, TDM audio payload, or TDM video payload).

Figure 6:
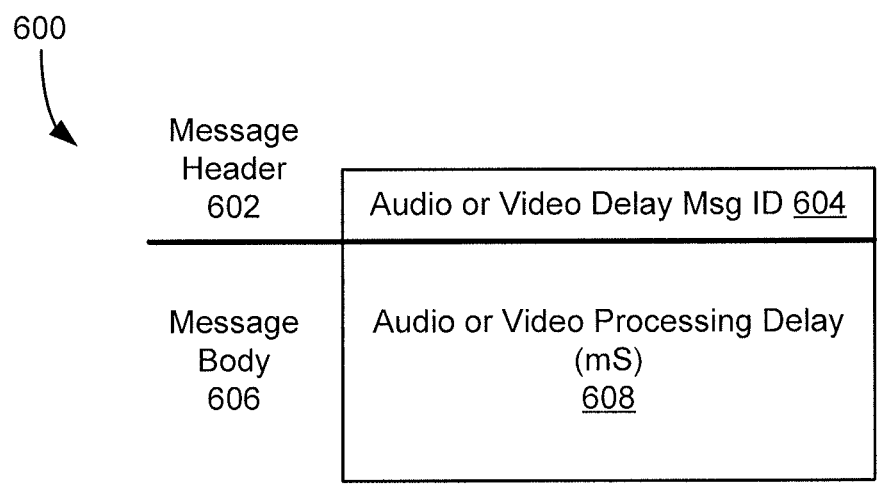
FIG. 6 is a diagram of an exemplary control message containing an indication of an amount of delay due to one of the intervening processing elements of FIG. 1.

As further described above, the MUX endpoint 202 of FIG. 2 is operative to receive, over the packet network 110, a control information packet stream including one or more control messages, each containing an indication of an amount of delay due to one of the intervening processing elements 106, 108 (see FIG. 1) associated with the IP video channel 112 and the IP audio channel 114, respectively. In an analogous fashion, the DEMUX endpoint 204 of FIG. 2 is operative to receive a control information stream including one or more control messages, each containing an indication of an amount of delay due to an intervening processing element associated with, for example, a TDM video channel or a TDM audio channel. FIG. 6 depicts an exemplary embodiment 600 (also referred to herein as a "control message 600") of such control messages that may be received at the MUX endpoint 202 or at the DEMUX endpoint 204. As shown in FIG. 6, the control message 600 includes a message header 602 and a message body 606. In accordance with the exemplary embodiment of FIG. 6, the message header 602 includes at least one storage location including an audio or video delay message ID 604. Further, the message body 606 includes a storage location for the value (typically—but not necessarily—amounting to milliseconds) of an audio or video processing delay 608.

Having described the above illustrative embodiments of the disclosed systems and methods of adjusting synchronization of audio and video media streams in 3G mobile communications systems, it is noted that other alternative embodiments or variations may be made/practiced. For example, it was described above that the MUX endpoint 202 of FIG. 2 can apply a delay factor to the faster one of the IP audio channel 114 and the IP video channel 112 according to the arrival times of RTP payloads contained in the corresponding IP audio stream or IP video stream. In an analogous fashion, the DEMUX endpoint 204 of FIG. 2 can apply a delay factor to the faster one of a TDM audio channel and a TDM video channel according to the arrival times of TDM payloads contained in the corresponding TDM audio stream or TDM video stream. To wit, the MUX endpoint 202 and the DEMUX endpoint 204 can take note of the arrival times of the RTP and TDM payloads, respectively, and apply suitable delay factors to place the corresponding audio and video streams in proper temporal alignment. In accordance with one or more alternative embodiments, the MUX endpoint 202 can be further configured to track RTP timestamps as well as the arrival times of RTP payloads to detect temporal skews between the RTP timestamps and the network time protocol (NTP) time (also referred to herein as the "wall clock time"). The MUX endpoint 202 can then apply further delay factors to the appropriate IP channels based on the detected temporal skews between the RTP timestamps and the wall clock time.

It was further described above that the disclosed systems and methods may be employed in conjunction with the MUX/DEMUX endpoint 102 of FIG. 1 to provide 3G connections between the packet network 110 such as an IP-based network, and the circuit-switched wireless network 104 such as a TDM-based network. In accordance with one or more alternative embodiments, the disclosed systems and methods may also be employed to provide 3G connections between multiple IP-based networks, and to provide 3G connections between multiple TDM-based networks.

It was also described above that the MUX endpoint 202 of FIG. 2 and the DEMUX endpoint 204 of FIG. 2 are operative to receive control information streams including control messages containing reports of amounts of delay due to intervening processing elements associated with the IP video channel 112, the IP audio channel 114, a TDM video channel, and/or a TDM audio channel within the 3G mobile communications system 100 (see FIG. 1). In accordance with one or more alternative embodiments, the intervening processing elements (e.g., the intervening processing elements 106, 108 of FIG. 1) are operative to generate such delay reports, and to transmit the delay reports to the MUX endpoint 202 and/or the DEMUX endpoint 204 over the packet network 110 (see FIG. 1), the circuit-switched wireless network 104 (see FIG. 1), or any other suitable network. Moreover, in accordance with one or more alternative embodiments, the 3G mobile communications system 100 may further include a central controller 140 (see FIG. 1) communicably coupled to the packet network 110. For example, the central controller 140 may be operative to receive such delay reports from the intervening processing elements, and to transmit the delay reports to the MUX endpoint 202 and/or the DEMUX endpoint 204 over the packet network 110 or any other suitable network, including the circuit-switched wireless network 104.

In addition, it was described above that, having received the reports of delay due to the intervening processing elements associated with the respective audio channels and/or video channels, the MUX endpoint 202 and the DEMUX endpoint 204 are operative to execute a plurality of functions, including calculating relative amounts of delay for the respective audio channels and video channels, determining the faster audio channel(s) or video channel(s) based on the delay reports, and applying delay factors based on the relative amounts of delay to the faster audio channel(s) or video channel(s). In accordance with one or more alternative embodiments, one or more of the functions of the MUX endpoint 202 and/or the DEMUX endpoint 204, such as the calculating of the relative amounts of delay and the determining of the faster audio channel(s) or video channel(s), may be performed at the central controller 140, or distributed among the MUX endpoint 202, the DEMUX endpoint 204, and/or the central controller 140. Moreover, the central controller 140 may be operative to transmit reports of the relative amounts of delay to the MUX endpoint 202 and/or the DEMUX endpoint 204, as appropriate, over the packet network 110 or any other suitable network, including the circuit-switched wireless network 104.

It will be appreciated by those of ordinary skill in the art that one or more of the functions necessary to implement the above-described systems and methods of adjusting synchronization of audio media streams and video media streams in 3G mobile communications systems can be embodied—in whole or in part—in hardware, software, or some suitable combination of hardware and software, using programmable micro-processors, micro-controllers, digital signal processors, and/or logic arrays, read-only memory (ROM), random access memory (RAM), CD-ROM, personal computers, server computers, client computers, computer programs, program instructions stored on processor readable media, and computer displays, wire-based, optical fiber-based, or wireless communications networks, media, and/or devices, and/or any other suitable hardware and/or software components and/or devices.

It will be appreciated by those skilled in the art that modifications to and variations of the above-described systems and methods may be made without departing from the inventive concepts disclosed herein. Accordingly, the disclosure should not be viewed as limited except as by the scope and spirit of the appended claims.

What is claimed is:

1. A method of adjusting synchronization of an audio media stream and a video media stream in which at least one of the audio media stream or the video media stream is subjected to at least one delay, the method comprising the steps of:

arranging at least one media processing component to manage synchronization of the audio media stream and the video media stream directed between a packet-switched network and a circuit-switched network in a mobile communications system, the at least one media processing component including at least one processor;

receiving, by the at least one processor, at least one control message in a control information stream in accordance with a control protocol reporting the at least one delay associated with the audio media stream or the video media stream;

calculating, by the at least one processor, a relative amount of delay between the audio media stream and the video media stream using the at least one delay reported by the at least one control message;

determining, by the at least one processor, a faster one of the audio media stream and the video media stream, such determination being based at least in part on the at least one delay reported by the at least one control message;

reading, by the at least one processor, at least one packet from the respective media stream carried by the faster one of the audio media stream and the video media stream, and determining, by the at least one processor, at least one arrival time of the at least one packet; and modifying, at a media endpoint within the mobile communications system, a discrete entry in the faster one of the audio media stream and the video media stream to include a delay factor based on the relative amount of delay, thereby permitting adjustment of the synchronization of the audio media stream and the video media stream.

2. The method of claim 1, further comprising:
modifying the discrete entry in the faster one of the audio media stream and the video media stream in accordance with at least the at least one arrival time of the at least one packet.

3. The method of claim 1 further comprising:
reading, by the at least one processor, at least one packet from the respective media stream carried by the faster one of the audio media stream and the video media stream, and obtaining at least one payload from the at least one packet.

4. The method of claim 3 further comprising:
storing the at least one payload in a queue at the media endpoint.

5. The method of claim 4 wherein the queue includes a plurality of buffers, and wherein the storing of the at least one payload includes storing the at least one payload in at least one of the plurality of buffers.

6. The method of claim 5, further comprising:
appending the delay factor to the at least one of the plurality of buffers in which the at least one payload is stored.

7. The method of claim 6 wherein modifying the discrete entry includes aging the delay factor.

8. The method of claim 7 further comprising:
responsive to the delay factor being aged at least approximately to zero, reading, at the media endpoint, the at least one payload from the queue.

9. The method of claim 8 further comprising:
assembling, at the media endpoint, at least one multimedia packet containing the at least one payload.

10. The method of claim 9 further comprising:
forming at least one frame from the at least one multimedia packet.

11. The method of claim 9 further comprising:
encapsulating the at least one multimedia packet.

12. The method of claim 9 further comprising:
transmitting, from the media endpoint, the at least one multimedia packet over at least one network.

13. The method of claim 12 wherein the at least one network includes an Internet protocol (IP) network, and wherein the transmitting of the at least one multimedia packet includes transmitting, from the media endpoint, the at least one multimedia packet over the IP network.

14. The method of claim 12 wherein the at least one network includes a circuit-switched wireless network, and wherein the transmitting of the at least one multimedia packet includes transmitting, from the media endpoint, the at least one multimedia packet over the circuit-switched wireless network.

15. The method of claim 1 wherein the at least one processor is included in the media endpoint, and wherein the receiving of the at least one control message includes receiving the at least one control message by the at least one processor within the media endpoint.

16. The method of claim 1 wherein the at least one processor is included in a central controller within the mobile communications system, and wherein the receiving of the at least one control message includes receiving the at least one control message by the at least one processor within the central controller.

17. The method of claim 16 further comprising:
transmitting, from the central controller, at least one report of one or more of the at least one delay due to the at least one media processing component and the relative amount of delay to the media endpoint.

18. The method of claim 16 wherein one or more of the calculating of the relative amount of delay and the determining of the faster one of the audio media stream and the video media stream are distributed among the media endpoint and the central controller.

19. A system for adjusting synchronization of an audio media stream and a video media stream in which at least one of the audio media stream or the video media stream is subjected to at least one delay, the system comprising:
at least one media endpoint operative:
  to manage synchronization of the audio media stream and the video media stream directed between a packet-switched network and a circuit-switched network in a mobile communications system;
  to receive at least one control message in a control information stream in accordance with a control protocol reporting the at least one delay associated with the audio media stream or the video media stream;
  to calculate a relative amount of delay between the audio media stream and the video media stream using the at least one delay reported by the at least one control message;
  to determine a faster one of the audio media stream and the video media stream based at least in part on the at least one delay reported by the at least one control message;
  to read at least one packet from the respective media stream carried by the faster one of the audio media stream and the video media stream, and to determine at least one arrival time of the at least one packet; and
  to modify a discrete entry in the faster one of the audio media stream and the video media stream to include a delay factor based on the relative amount of delay, thereby permitting adjustment of the synchronization of the audio media stream and the video media stream.

20. The system of claim 19 wherein the at least one media endpoint is further operative to modify the discrete entry in the faster one of the audio media stream and the video media stream according to the at least one arrival time of the at least one packet.

21. The system of claim 19 wherein the at least one media endpoint is further operative to read at least one packet from the respective media stream carried by the faster one of the audio media stream and the video media stream, and to obtain at least one payload from the at least one packet.

22. The system of claim 21 wherein the at least one media endpoint includes at least one queue, and wherein the at least one media endpoint is further operative to store the at least one payload in the at least one queue.

23. The system of claim 22 wherein the queue includes a plurality of buffers, and wherein the at least one media endpoint is further operative to store the at least one payload in at least one of the plurality of buffers.

24. The system of claim 23 wherein the at least one media endpoint is further operative to append the delay factor to the at least one of the plurality of buffers in which the at least one payload is stored.

25. The system of claim 24 wherein the at least one media endpoint is further operative to age the delay factor.

26. The system of claim 25 wherein the at least one media endpoint is further operative, in response to the delay factor being aged at least approximately to zero, to read the at least one payload from the queue.

27. The system of claim 26 wherein the at least one media endpoint is further operative to assemble at least one multimedia packet containing the at least one payload.

28. The system of claim 27 wherein the at least one media endpoint is further operative to form at least one frame from the at least one multimedia packet.

29. The system of claim 27 wherein the at least one media endpoint is further operative to encapsulate the at least one multimedia packet.

30. The system of claim 27 wherein the at least one media endpoint is further operative to transmit the at least one multimedia packet over at least one network.

31. The system of claim 30 wherein the at least one network includes an Internet protocol (IP) network, and wherein the at least one media endpoint is further operative to transmit the at least one multimedia packet over the IP network.

32. The system of claim 31 wherein the at least one media endpoint includes a multiplexer media endpoint.

33. The system of claim 30 wherein the at least one network includes a circuit-switched wireless network, and wherein the at least one media endpoint is further operative to transmit the at least one multimedia packet over the circuit-switched wireless network.

34. The system of claim 33 wherein the at least one media endpoint includes a de-multiplexer media endpoint.

35. A system for adjusting synchronization of an audio media stream and a video media stream, in which at least one of the audio media stream or the video media stream is subjected to at least one delay, the system comprising:
 at least one media processing component to manage synchronization of the audio media stream and the video media stream directed between a packet-switched network and a circuit-switched network in a mobile communications system, the at least one media processing component including one or more processors operative to execute a plurality of functions:
 to receive at least one control message in a control information stream in accordance with a control protocol reporting the at least one delay associated with the audio media stream or the video media stream;
 to calculate a relative amount of delay between the audio media stream and the video media stream using the at least one delay reported by the at least one control message;
 to determine a faster one of the audio media channel and the video media stream based at least in part on the at least one delay reported by the at least one control message;
 to read at least one packet from the respective media stream carried by the faster one of the audio media stream and the video media stream, and to determine at least one arrival time of the at least one packet; and
 to modify a discrete entry in the faster one of the audio media stream and the video media stream to include a delay factor based on the relative amount of delay, thereby permitting adjustment of the synchronization of the audio media stream and the video media stream.

36. The system of claim 35 further comprising a media endpoint, and wherein the one or more processors are included in the media endpoint.

37. The system of claim 35 further comprising a central controller, and wherein the one or more processors are included in the central controller.

38. The system of claim 35 further comprising a media endpoint and a central controller, and wherein a portion of the one or more processors is included in each of the media endpoint and the central controller.

39. The system of claim 38 wherein the plurality of functions executed by the one or more processors are distributed among the media endpoint and the central controller.

40. A method of adjusting synchronization of an audio media stream and a video media stream in which at least one of the audio media stream or the video media stream is subjected to at least one delay, the method comprising the steps of:
 arranging at least one media processing component to manage synchronization of the audio media stream and the video media stream directed between a packet-switched network and a circuit-switched network in a mobile communications system, the at least one media processing component including at least one processor;
 receiving, by the at least one processor, at least one control message in a control information stream in accordance with a control protocol reporting the at least one delay associated with the audio media stream or the video media stream;
 calculating, by the at least one processor, a relative amount of delay between the audio media stream and the video media stream using the at least one delay reported by the at least one control message;
 determining, by the at least one processor, a faster one of the audio media stream and the video media stream, such determination being based at least in part on the at least one delay reported by the at least one control message; and
 modifying, at a media endpoint within the mobile communications system, a discrete entry in the faster one of the audio media stream and the video media stream to include a delay factor based on the relative amount of delay and on an arrival time at the media endpoint of a packet in the faster one of the audio media stream and the video media stream, thereby permitting adjustment of the synchronization of the audio media stream and the video media stream.

41. A system for adjusting synchronization of an audio media stream and a video media stream in which at least one of the audio media stream or the video media stream is subjected to at least one delay, the system comprising:
 at least one media endpoint operative:
 to manage synchronization of the audio media stream and the video media stream directed between a packet-switched network and a circuit-switched network in a mobile communications system;
 to receive at least one control message in a control information stream in accordance with a control protocol reporting the at least one delay associated with the audio media stream or the video media stream;
 to calculate a relative amount of delay between the audio media stream and the video media stream using the at least one delay reported by the at least one control message;

to determine a faster one of the audio media stream and the video media stream based at least in part on the at least one delay reported by the at least one control message; and to modify a discrete entry in the faster one of the audio media stream and the video media stream to include a delay factor based on the relative amount of delay and on an arrival time at the media endpoint of a packet in the faster one of the audio media stream and the video media stream, thereby permitting adjustment of the synchronization of the audio media stream and the video media stream.

\* \* \* \* \*